(12) United States Patent
Miyoshi et al.

(10) Patent No.: US 10,443,784 B2
(45) Date of Patent: Oct. 15, 2019

(54) SYSTEM FOR CONTROLLING GAS SUPPLY UNIT

(71) Applicant: TOYOTA JIDOSHA KABUSHIKI KAISHA, Toyota-shi, Aichi-ken (JP)

(72) Inventors: Shinji Miyoshi, Okazaki (JP); Shusuke Inagi, Okazaki (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 210 days.

(21) Appl. No.: 14/749,789

(22) Filed: Jun. 25, 2015

(65) Prior Publication Data
US 2015/0377416 A1 Dec. 31, 2015

(30) Foreign Application Priority Data

Jun. 26, 2014 (JP) ................................ 2014-131064

(51) Int. Cl.
*F17C 5/06* (2006.01)
*F17C 13/00* (2006.01)
(Continued)

(52) U.S. Cl.
CPC .............. *F17C 5/06* (2013.01); *F17C 13/002* (2013.01); *F17C 13/025* (2013.01); *F17C 13/026* (2013.01); *G05D 7/0635* (2013.01); *F17C 2203/0634* (2013.01); *F17C 2221/012* (2013.01); *F17C 2221/033* (2013.01); *F17C 2221/035* (2013.01); *F17C 2223/0123* (2013.01); *F17C 2223/036* (2013.01);
(Continued)

(58) Field of Classification Search
CPC ........ F17C 5/06; F17C 13/002; F17C 13/025; F17C 13/026; G05D 7/0635
See application file for complete search history.

(56) References Cited

U.S. PATENT DOCUMENTS 4,550,747 A * 11/1985 Woodworth ......... G05D 7/0635
137/487.5
8,662,115 B2 * 3/2014 Mori ....................... F17C 5/007
141/192
(Continued)

FOREIGN PATENT DOCUMENTS

CN 102282410 A 12/2011
CN 102667302 A 9/2012
(Continued)

*Primary Examiner* — Andrew D St Clair
(74) *Attorney, Agent, or Firm* — Finnegan, Henderson, Farabow, Garrett & Dunner, LLP (57) ABSTRACT

A system for controlling a gas supply unit supplying gas to a tank includes a pressure acquisition unit configured to acquire the pressure in the tank; and a controller configured to perform first filling for supplying the gas to the tank and to perform second filling, based on a flow rate determined based on a change in the pressure in the tank for a predetermined period of time during the first filling, by controlling the gas supply unit. The controller is configured to cause the gas supply unit to perform the first filling at a first flow rate in a case where the pressure in the tank prior to the first filling is a first pressure and perform the first filling at a second flow rate exceeding the first flow rate in a case where the pressure is a second pressure exceeding the first pressure.

6 Claims, 9 Drawing Sheets

(51) Int. Cl.
*F17C 13/02* (2006.01)
*G05D 7/06* (2006.01)

(52) U.S. Cl.
CPC ............ *F17C 2225/0123* (2013.01); *F17C 2225/036* (2013.01); *F17C 2227/0157* (2013.01); *F17C 2227/0337* (2013.01); *F17C 2227/04* (2013.01); *F17C 2250/01* (2013.01); *F17C 2250/032* (2013.01); *F17C 2250/043* (2013.01); *F17C 2250/0439* (2013.01); *F17C 2250/0443* (2013.01); *F17C 2250/0491* (2013.01); *F17C 2250/0636* (2013.01); *F17C 2260/021* (2013.01); *F17C 2260/022* (2013.01); *F17C 2260/023* (2013.01); *F17C 2265/06* (2013.01); *F17C 2265/065* (2013.01); *F17C 2270/0168* (2013.01); *F17C 2270/0184* (2013.01); *Y02E 60/321* (2013.01)

(56) References Cited

U.S. PATENT DOCUMENTS

| | | | | |
|---|---|---|---|---|
| 2002/0014277 | A1* | 2/2002 | Togasawa | F16K 17/30 141/95 |
| 2005/0178463 | A1* | 8/2005 | Kountz | F17C 9/02 141/4 |
| 2005/0247123 | A1* | 11/2005 | Fuse | G01F 15/0755 73/290 R |
| 2007/0276545 | A1* | 11/2007 | Smirnov | G05B 13/024 700/282 |
| 2010/0307636 | A1* | 12/2010 | Uemura | F17C 5/06 141/4 |
| 2012/0000574 | A1* | 1/2012 | Nishiumi | F17C 5/06 141/94 |
| 2012/0125480 | A1* | 5/2012 | Inagi | F17C 5/06 141/4 |
| 2012/0125482 | A1* | 5/2012 | Mori | F17C 5/007 141/98 |
| 2012/0132301 | A1 | 5/2012 | Hobmeyr et al. | |
| 2012/0227864 | A1* | 9/2012 | Mori | F17C 5/06 141/95 |
| 2012/0267002 | A1* | 10/2012 | Kittilsen | F17C 5/06 141/4 |
| 2012/0298256 | A1* | 11/2012 | Mori | F17C 5/007 141/94 |
| 2013/0037165 | A1* | 2/2013 | Okawachi | F17C 5/06 141/4 |
| 2013/0146148 | A1* | 6/2013 | Smirnov | F17D 1/16 137/13 |

FOREIGN PATENT DOCUMENTS

| | | |
|---|---|---|
| DE | 10 2011 119 077 A1 | 5/2012 |
| DE | 11 2010 004 462 T5 | 8/2012 |
| JP | 8-291898 | 11/1996 |
| JP | 2005-127430 | 5/2005 |
| JP | 2011-106583 | 6/2011 |
| JP | 2011-226558 | 11/2011 |
| WO | WO 2011/061584 A1 | 5/2011 |

\* cited by examiner

SYSTEM FOR CONTROLLING GAS SUPPLY UNIT

INCORPORATION BY REFERENCE

The disclosure of Japanese Patent Application No. 2014-431064 filed on Jun. 26, 2014 including the specification, drawings and abstract is incorporated herein by reference in its entirety.

BACKGROUND OF THE INVENTION

1. Field of the Invention

The invention relates to a technique for filling a tank with gas.

2. Description of Related Art

A technique for determining a flow rate for gas filling, based on the pressure and the temperature in a tank prior to filling initiation and the temperature of the gas with which the tank is filled and in accordance with a map, when the tank is filled with the gas is available (Japanese Patent Application Publication No. 2011-406583). In addition, gas filling over a short period of time (hereinafter, referred to as "preliminary filling") is performed prior to the gas filling for the tank (hereinafter, referred to as "main filling") in this technique. A map to be used in the flow rate determination is selected from a plurality of maps based on an increment in the temperature and an increment in the pressure of the tank during the preliminary filling.

In the technique described above, the increment in the pressure that is measured during the preliminary filling is not sufficiently large with respect to the noise during the measurement in a case where the amount of the gas remaining in the tank is equal to or greater than a predetermined amount. Accordingly, the increment in the pressure of the tank during the preliminary filling may not be measured with accuracy. Additionally, it may be impossible to select an appropriate map and appropriately determine a flow rate for the main filling. In addition, reduction in apparatus size, cost reduction, resource conservation, facilitated filling, improvement in apparatus usability, and the like have been desired regarding gas filling techniques.

SUMMARY OF THE INVENTION

The invention provides a system for controlling a gas supply unit.

According to an aspect of the invention, there is provided a system for controlling a gas supply unit supplying gas to a tank. The system includes a pressure acquisition unit configured to acquire the pressure in the tank; and a controller configured to perform first filling for supplying the gas to the tank by controlling the gas supply unit and to perform second filling for supplying the gas to the tank, based on a flow rate determined based on a change in the pressure in the tank for a predetermined period of time during the first filling, by controlling the gas supply unit. The controller is configured to cause the gas supply unit to perform the first filling at a first flow rate in a case where the pressure in the tank prior to the first filling is a first pressure and the controller is configured to cause the gas supply unit to perform the first filling at a second flow rate exceeding the first flow rate in a case where the pressure in the tank prior to the first filling is a second pressure exceeding the first pressure. According to this aspect, the first filling is performed at a high flow rate in a case where the pressure in the tank prior to the first filling is high. Accordingly, the pressure change in the tank for a predetermined period of time can be given a higher value in a case where the pressure in the tank is high than in a manner in which the second filling is performed at a constant flow rate regardless of the pressure in the tank prior to the first filling. Accordingly, a flow rate for the second filling can be appropriately determined based on an accurate measured value of the pressure change in the tank for a predetermined period of time.

The first flow rate may be a fixed value or may be changed during the first filling. Likewise, the second flow rate may be a fixed value or may be changed during the first filling. In a case where the first and second flow rates are changed, the "second flow rate exceeding the first flow rate" means that the average value of the second flow rate during the first filling exceeds the average value of the first flow rate during the first filling.

In the aspect described above, the controller may be configured to set the flow rate for the first filling to the first flow rate in a case where the pressure in the tank prior to the first filling is less than a threshold that is equal to or greater than the first pressure and is equal to or less than the second pressure, and may be configured to set the flow rate for the first to the second flow rate in a case where the pressure in the tank prior to the first filling exceeds the threshold. According to this aspect, the flow rate setting for the first filling can be performed with simple control.

A manner in which the flow rate for the first filling is set as the first flow rate in a case where the pressure in the tank prior to the first filling is equal to the threshold may be possible. In addition, a manner in which the flow rate for the first filling is set as the second flow rate in a case where the pressure in the tank prior to the first filling is equal to the threshold may be possible.

In the aspect described above, the controller may be configured to set the flow rate for the first filling to the first flow rate prior to the setting of the flow rate for the first filling in accordance with the pressure in the tank. According to this aspect, the first filling is performed at the first flow rate that is less than the second flow rate in a case where the first filling is performed without the execution of the processing for setting the flow rate for the first filling in accordance with the pressure in the tank due to the malfunctioning of the controller. Likewise, in a manner in which the first filling is performed at the higher second flow rate in a ease where the first filling is performed without the execution of the processing for setting the flow rate in accordance with the pressure in the tank, the second flow rate-based filling entailing a higher flow rate and more energy consumption is basically performed in a case where the first flow rate-based. filling that can be realized with a lower flow rate and less energy consumption should be performed. According to the aspect described above, the energy consumption during the malfunctioning of the system can be decreased, in comparison to a manner in which the first filling is performed at the second flow rate exceeding the first flow rate, in a case where the first filling is performed without the execution of the processing for setting the flow rate in accordance with the pressure in the tank.

In the aspect described above, the threshold may be within a range of 1 to 10 MPa. In this manner, the flow rate during the second filling can be appropriately determined in a case where, for example, a tank taking a maximum pressure of 70 MPa is filled with the gas.

In the aspect described above, a temperature acquisition unit configured to acquire the temperature in the tank may also be provided. The controller may be configured to set the flow rate of the gas for the second filling in accordance with a first map for determining the flow rate of the gas based on the temperature and the pressure in the tank prior to the second filling when a change in the temperature in the tank for the predetermined period of time with respect to a change in the pressure in the tank for the predetermined period of time during the first filling is within a first range and may be configured to set the flow rate of the gas for the second filling in accordance with a second map for determining the flow rate of the gas based on the temperature and the pressure in the tank prior to the second filling, the second map determining a flow rate greater than in the first map with respect to the same input parameter, when the temperature change with respect to the pressure change is within a second range that is less than the first range. In this manner, the flow rate of the gas for the second filling can be set in view of the ease of heat dissipation by the tank.

In the aspect described above, a temperature acquisition unit configured to acquire the temperature in the tank may also be provided. The controller may be configured to set the flow rate of the gas for the second filling based on a change in the temperature in the tank for the predetermined period of time with respect to a change in the pressure in the tank for the predetermined period of time during the first filling and a change in the temperature in the tank per unit time during the first tilling. In this manner, the flow rate of the gas for the second filling can be set in view of the ease of heat dissipation by the tank and the ease of temperature change in the tank.

The invention can also be realized in various forms other than the system and the method described above. The invention can be realized in the form of, for example, a gas filling system, a system for detecting tank characteristics, a gas filling method, a method for detecting tank characteristics, a method for controlling a gas supply unit, a computer program for realizing the methods, and a non-temporary recording medium having the computer program recorded therein.

BRIEF DESCRIPTION OF THE DRAWINGS

Features, advantages, and technical and industrial significance of exemplary embodiments of the invention will be described below with reference to the accompanying drawings, in Which like numerals denote like elements, and wherein.

DETAILED DESCRIPTION OF EMBODIMENTS

A. First Embodiment

A1. Configuration of Hydrogen Filling System 100 and Configuration of Vehicle 200

Figure 1:
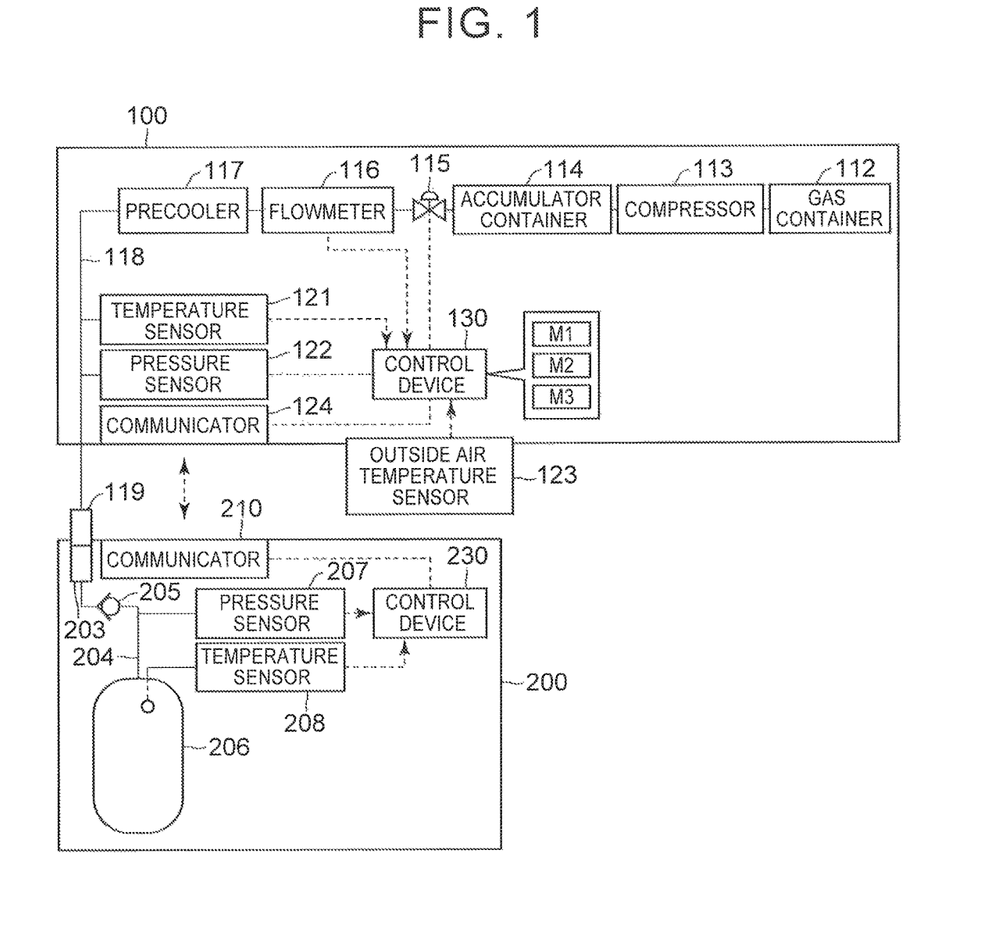
FIG. 1 is a block diagram illustrating the configuration of a hydrogen filling system 100 and the configuration of a vehicle 200 according to a first embodiment of the invention.

FIG. 1 is a block diagram illustrating the configuration of a hydrogen filling system 100 and the configuration of a vehicle 200 according to a first embodiment of the invention. The hydrogen filling system 100 is a system for filling the vehicle 200 with hydrogen gas. The hydrogen filling system 100 is provided with a gas container 112, a compressor 113, an accumulator container 114, a flow rate adjusting valve 115, a flowmeter 116, a precooler 117, a gas filling nozzle 119, a temperature sensor 121, a pressure sensor 122, an outside air temperature sensor 123, a communicator 124, and a control device 130. The gas container 112, the compressor 113, the accumulator container 114, the flow rate adjusting valve 115, the flowmeter 116, the precooler 117, and the gas filling nozzle 119 are connected in series in this order by a pipe 118.

The gas container 112 retains the hydrogen gas to be supplied to the vehicle 200. The compressor 113 receives the supply of the hydrogen gas from the gas container 112, compresses the hydrogen gas from the gas container 112, and boosts the hydrogen gas from the gas container 112 to a pressure of at least 70 MPa. The accumulator container 114 retains the hydrogen gas that is boosted to at least 70 MPa. The flow rate adjusting valve 115 allows the hydrogen gas having a predetermined flow rate to flow to a downstream side from the accumulator container 114 by following an instruction from the control device 130. The flowmeter 116 measures the flow rate of the gas that flows to the downstream side from the flow rate adjusting valve 115 and transmits a signal that shows a measured flow rate value to the control device 130. The precooler 117 cools the hydrogen gas that passes through the flowmeter 116 to a predetermined temperature. The gas filling nozzle 119 is connected to a receptacle 203 of the vehicle 200 and supplies the hydrogen gas to the vehicle 200. The gas that is used in the tilling can also be a gas other than hydrogen, examples of which include mixed gas consisting of methane, propane, and a plurality of substances.

The temperature sensor 121 measures the temperature of the hydrogen gas in the pipe 118 that passes through the precooler 117 and transmits a signal that shows a measured temperature value to the control device 130. The pressure sensor 122 measures the pressure of the hydrogen gas in the pipe 118 that passes through the precooler 117 and transmits a signal that shows a measured pressure value to the control device 130. The outside air temperature sensor 123 measures the temperature of the outside of the hydrogen filling system 100 and transmits a signal that shows a measured temperature value to the control device 130.

The control device 130 controls the flow rate adjusting valve 115, based on the flow rate signal obtained from the flowmeter 116, the hydrogen gas temperature signal obtained from the temperature sensor 121 and supplied to the vehicle 200, and the hydrogen gas pressure signal obtained from the pressure sensor 122 and supplied to the vehicle 200, so that the amount of the hydrogen gas supplied to the vehicle 200 has a target-value mass flow rate. In addition, the control device 130 controls the precooler 117, based on the hydrogen gas temperature signal obtained from the temperature sensor 121 and supplied to the vehicle 200 and the signal of the temperature of the outside of the hydrogen filling system 100 obtained from the outside air temperature sensor 123, so that the temperature of the hydrogen gas toward the vehicle 200 becomes equal to a target temperature. In addition, the control device 130 performs data communication with the vehicle 200 via the communicator 124.

The vehicle 200 is a vehicle that performs fuel cell-based electric power generation and traveling by using the hydrogen gas as a fuel. The vehicle 200 is provided with the receptacle 203, a check valve 205, a hydrogen gas tank 206, a pressure sensor 207, a temperature sensor 208, a communicator 210, and a control device 230. The receptacle 203, the check valve 205, and the hydrogen gas tank 206 are connected in series in this order by a pipe 204, The receptacle 203 is connected to the gas filling nozzle 119 of the hydrogen filling system 100 and receives the supply of the hydrogen gas. The check. valve 205 allows the flow of the hydrogen gas from the receptacle 203 toward the hydrogen gas tank 206 and blocks the flow of the hydrogen gas from the hydrogen gas tank 206 toward the receptacle 203, The pressure sensor 207 measures the pressure in the pipe 204 leading to the hydrogen gas tank 206 and transmits a signal that shows a measured pressure value to the control device 230. The pressure in the pipe 204 that is measured by the pressure sensor 207 can be regarded as the pressure of the hydrogen gas in the hydrogen gas tank 206. The temperature sensor 208 measures the temperature of the hydrogen gas in the hydrogen gas tank 206 and transmits a signal that shows a measured temperature value to the control device 230. It is preferable that the temperature sensor 208 is disposed at a position where a temperature close to the temperature of the largest portion of the hydrogen gas (so-called mode) in the temperature distribution of the hydrogen gas in the hydrogen gas tank 206 can be measured.

The control device 230 performs data communication with the hydrogen filling system 100 via the communicator 210 and the communicator 124 of the hydrogen filling system 100. More specifically, the control device 230 transmits information on the pressure of the hydrogen gas obtained from the pressure sensor 207 and the temperature of the hydrogen gas obtained from the temperature sensor 121 to the hydrogen filling system 100 via the communicator 210.

The hydrogen filling system 100 performs preliminary filling first when the hydrogen gas tank 206 of the vehicle 200 is filled with the hydrogen gas. Then, main filling is performed based on the parameter that is obtained during the preliminary filling. More specifically, a map that is used during the determination of the flow rate of the hydrogen gas for the main filling is selected from a plurality of sets of maps M1 to M3 based on the parameter that is obtained during the preliminary filling. Then, the flow rate of the hydrogen gas for the main filling is determined by using the selected map and the main filling is executed. The plurality of sets of maps M1 to M3 that are used to determine the flow rate of the hydrogen gas for the main filling are retained in the control device 130 of the hydrogen filling system 100 (refer to FIG. 1).

The maps M1 to M3 that are used to determine the flow rate of the hydrogen gas for the main filling are maps (look-up tables) for determining the flow rate of the hydrogen gas for the main filling by using three parameters as input parameters, the three parameters being the pressure and the temperature in the hydrogen gas tank 206 prior to the initiation of the main filling and the temperature of the hydrogen gas with which the tank is filled. In the maps M1 to M3, conditions are determined by using the pressure and the temperature in the hydrogen gas tank 206 prior to the initiation of the main filling and the temperature of the hydrogen gas with which the tank is filled and the flow rate of the hydrogen gas under each of the conditions is determined so that the hydrogen gas tank 206 can be filled with the largest possible amount of the hydrogen gas per unit time while the temperature of the hydrogen gas in the hydrogen gas tank 206 is kept at or below a predetermined value (for example, 85° C.) under the conditions. The heat dissipation performances (ease of heat dissipation.) of the hydrogen gas tank assumed in the maps M1 to M3 are different from each other. The flow rate for the main filling can also be determined by using a map for determining the flow rate for the main filling based only on the pressure and the temperature of the gas in the tank prior to the initiation of the main filling. In addition, the flow rate for the main filling can also be determined by using a map that is configured to allow for a parameter other than the pressure and the temperature of the gas in the tank and the temperature of the gas with which the tank is filled.

The map M2 has a combination of the input parameters in which the flow rate of the hydrogen gas as an output value is greater than in the map M1 in a case where the input parameters are identical to each other without exception. The map M2 may partially include a combination of the input parameters in which the flow rate of the hydrogen gas as the output value is equal to that in the map M1 in a case where the input parameters are identical to each other without exception. The map M2 does not have a combination of the input parameters in which the flow rate of the hydrogen gas as the output value is less than in the map M1 in a case where the input parameters are identical to each other without exception.

The map M3 has a combination of the input parameters in which the flow rate of the hydrogen gas as the output value is greater than in the map M2 in a case where the input parameters are identical to each other without exception. The map M3 may partially include a combination of the input parameters in which the flow rate of the hydrogen gas as the output value is equal to that in the map M2 in a case where the input parameters are identical to each other without exception. The map M3 does not have a combination of the input parameters in which the flow rate of the hydrogen gas as the output value is less than in the map M2 in a case where the input parameters are identical to each other without exception.

The gas container 112, the compressor 113, the accumulator container 114, the flow rate adjusting valve 115, the flowmeter 116, the precooler 117, the gas filling nozzle 119, and the pipe 118 that are connected in series by the pipe 118 correspond to the "gas supply unit" in the SUMMARY OF THE INVENTION. The communicator 124 that acquires the pressure of the hydrogen gas in the hydrogen gas tank. 206 from the vehicle 200 corresponds to the "pressure acquisition unit" and the "temperature acquisition unit". The control device 130 corresponds to the "controller". The communicator 124 and the control device 130 correspond to the "system for controlling the gas supply unit". The map M1 corresponds to the "first map". The map M2 and the map M3 correspond to the "second map".

A2. Preliminary Filling

Figure 2:
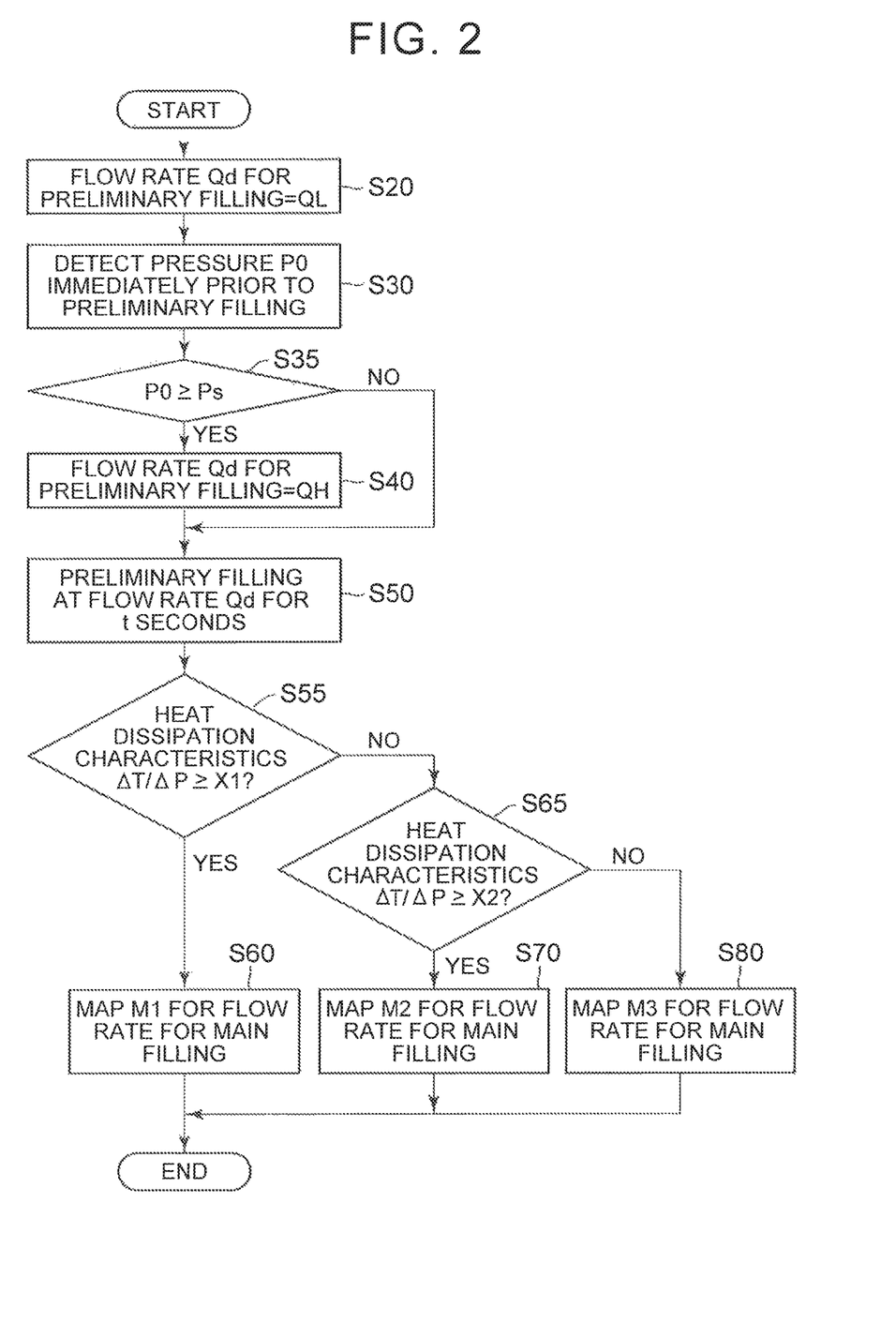
FIG. 2 is a flowchart illustrating the processing of preliminary filling that is carried out when a hydrogen gas tank 206 is filled with hydrogen gas.

FIG. 2 is a flowchart illustrating the processing of the preliminary filling that is carried out when the hydrogen gas tank 206 of the vehicle 200 is filled with the hydrogen gas by the hydrogen filling system 100. The processing in FIG. 2 is executed by the control device 130 controlling each section of the hydrogen filling system 100 and, in addition, acquiring necessary information from the vehicle 200.

In Step S20, the control device 130 sets the flow rate Qd of the hydrogen gas for the preliminary filling to QL. In the present specification, the flow rate is defined as mass per unit time. In this embodiment, QL is 12 g/sec. The default value of the flow rate Qd may be set in advance prior to the initiation of the processing of the preliminary filling illustrated in FIG. 2.

In Step S30, the control device 130 acquires the pressure P0 in the hydrogen gas tank 206 immediately prior to the preliminary filling. Specifically, the control device 130 acquires the pressure in the hydrogen gas tank 206 that is acquired by the pressure sensor 207 from the vehicle 200 via the communicator 124 (refer to FIG. 1). The measurement of the pressure in the tank for determining the flow rate for the preliminary filling can also be performed at an earlier moment. It is preferable that the length of time from the measurement of the pressure in the tank to the initiation of the preliminary filling is short.

in Step S35, the control device 130 determines whether or not the pressure P0 is equal to or greater than a threshold Ps. The threshold Ps is, for example, 5 MPa. In a case where the pressure P0 is equal to or greater than the threshold Ps in Step S35 (S35: Yes), the processing proceeds to Step S40. In a case where the pressure P0 is less than the threshold Ps (S35: No), the processing proceeds to Step S50.

In Step S40, the control device 130 resets the flow rate Qd of the hydrogen gas for the preliminary filling from QL to QH (QH>QL). In this embodiment, QH is 35 g/sec In this manner, the preliminary filling (Step S50) is performed at the flow rate QL, which is less than the flow rate QH, in a case where the processing of Steps S35 and S40 is not appropriately performed due to system malfunctioning or the like. Accordingly, the energy that is consumed by the system can be reduced compared to a manner in which the flow rate QH is set first in Step S20.

The flow rate Qd of the hydrogen gas for the preliminary filling is set to QL in a case where the pressure P0 in the hydrogen gas tank 206 immediately prior to the preliminary filling is less than the threshold Ps and the flow rate Qd of the hydrogen gas for the preliminary filling is set to QH in a case where the pressure P0 in the hydrogen gas tank 206 immediately prior to the preliminary filling is equal to or greater than the threshold Ps as a result of the processing of Steps S20 to S40. In this embodiment, the flow rate is divided into two in accordance with the pressure of the tank for the preliminary filling (refer to S20 in FIG. 2). However, the flow rate can also be divided into three or more, for example, three, four, or the like, in accordance with the pressure of the tank for the preliminary filling.

In Step S50, the control device 130 performs the preliminary filling for a predetermined period of time t at the flow rate Qd that is set. The period of time t during which the preliminary filling is performed is three seconds in this embodiment. The pressure of the hydrogen gas in the hydrogen gas tank 206 is measured by the pressure sensor 207 while the preliminary filling is being performed (refer to FIG. 1). In addition, the temperature of the hydrogen gas in the hydrogen gas tank 206 is measured by the temperature sensor 208 while the preliminary filling is being performed.

In Step S55, the control device 130 calculates a temperature increment $\Delta T$ in the period of time t during which the preliminary filling is performed with respect to a pressure increment $\Delta P$ in the period of time t during which the preliminary filling is performed, that is, $\Delta T/\Delta P$. Then, the control device 130 determines whether or not $\Delta T/\Delta P$ is equal to or greater than a threshold X1.

The pressure P and the temperature T of an ideal gas satisfy the gas state equation of $PV=nRT$, in which n represents the amount of substance of the gas, V represents the volume of the gas, and R represents a gas constant. The gas constant R and the volume V (capacity of the hydrogen gas tank 206) are constant. The mass of the hydrogen gas with which the hydrogen gas tank 206 is filled per unit time during the preliminary filling according to this embodiment is controlled to be constant (refer to S20 and S40 in FIG. 2), and the period of time t of the preliminary filling is also constant. Accordingly, the increment $\Delta n$ of the amount of substance of the hydrogen gas in the hydrogen gas tank 206 that is attributable to the preliminary filling is constant regardless of the vehicle and the hydrogen tank. Then, $\Delta T/\Delta P$ should ideally be constant.

However, $\Delta T/\Delta P$ is different from hydrogen tank to hydrogen tank in individual vehicles. One of the factors of the difference is because the temperature of the hydrogen gas in the hydrogen tank becomes higher than an environmental temperature due to the supply of the hydrogen gas and heat is released to the outside from the hydrogen gas in the hydrogen tank via a wall surface of the hydrogen tank. The degree of the release of the heat, that is, the amount of the heat that is released to the outside from the hydrogen gas in the hydrogen tank per unit time depends on, for example, the shape, wall thickness, material, and arrangement of the hydrogen tank of each of the vehicles. As a result, $\Delta T/\Delta P$ is different from hydrogen tank to hydrogen tank in the individual vehicles. Accordingly, $\Delta T/\Delta P$ that is obtained in Step S55 in FIG. 2 reflects the heat dissipation performance of the hydrogen tank of the vehicle. The hydrogen tank is a tank that releases more heat to the outside per unit time as $\Delta T/\Delta P$ becomes smaller.

It is preferable that the temperature of the hydrogen gas in the hydrogen gas tank 206 is kept at or below a predetermined value (for example, 85° C.) so that the wall surface of the hydrogen tank is protected. For example, the SAEJ2601 Standard also defines that the temperature of the hydrogen tank should be kept at or below 85° C. Accordingly, the following constraints arise when the hydrogen filling is to be completed within the shortest period of time possible under a condition in which the temperature of the hydrogen tank is kept at or below a constant value. A hydrogen gas tank 206H that releases a large amount of heat to the outside per unit time can be filled with a large amount of the hydrogen gas per unit time. A hydrogen gas tank 206L that releases a smaller amount of heat to the outside per unit time than the hydrogen gas tank 206H can be filled with only a smaller amount of the hydrogen gas per unit time than the hydrogen gas tank 206H.

In a case where $\Delta T/\Delta P$ is equal to or greater than the threshold X1 in Step S55 in FIG. 2 (S55: Yes), the processing proceeds to Step S60. A greater $\Delta T/\Delta P$ means that a smaller amount of heat is released from the tank per unit time. In Step S60, the control device 130 adopts the map M1 as a map to refer to during the determination of the flow rate for the main filling. The map M1 is a map in which the output flow rate under the same condition is less than in the other maps M2, M3.

In a case where ΔT/ΔP is less than the threshold X1 in Step S55 (S55: No), the processing proceeds to Step S65. In Step S65, the control device 130 determines whether or not ΔT/ΔP is equal to or greater than a threshold X2 (X2>X1).

In a case where ΔT/ΔP is equal to or greater than the threshold X2 in Step S65 (S65: Yes), the processing proceeds to Step S70. In Step S70, the control device 130 adopts the map M2 as a map to refer to during the determination of the flow rate for the main filling. The map M2 is a map in which the output flow rate under the same condition is less than in the map M3 and the output flow rate under the same condition is greater than in the map M1.

In a case were ΔT/ΔP is less than the threshold X2 in Step S65 (S65: No), the processing proceeds to Step S80. A smaller ΔT/ΔP means that a larger amount of heat is released from the tank per unit time. In Step S80, the control device 130 adopts the map M3 as a map to refer to during the determination of the flow rate for the main filling. The map M3 is a map in which the output flow rate under the same condition is greater than in the other maps M1, M2.

The processing of the preliminary filling in FIG. 2 is terminated after the map that is to be used during the determination of the flow rate for the main filling is selected in Steps S60, S70, and S80.

Figure 3:
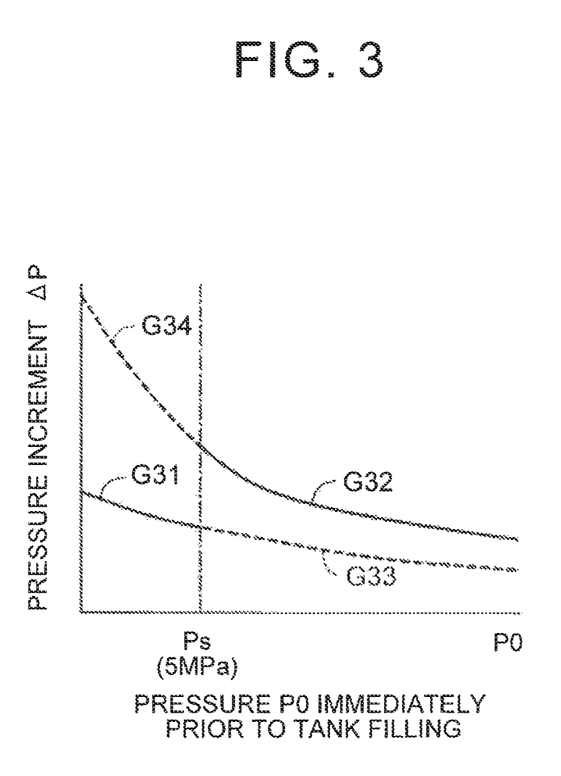
FIG. 3 is a graph illustrating pressure increments AP during the preliminary filling corresponding to various pressures P0 prior to the preliminary filling by using the same tank.

FIG. 3 is a graph illustrating the pressure increments ΔP during the preliminary filling corresponding to the various pressures P0 prior to the preliminary filling by using a certain tank. The period of time of the preliminary filling is t (three seconds). In a case where the pressure P0 prior to the preliminary filling is within a range less than the threshold Ps (S35 in FIG. 2: No), the pressure increment ΔP during the preliminary filling has the value that is illustrated by the solid-line graph G31. In this case, the preliminary filling is performed at the flow rate QL (12 g/sec in this embodiment). In a case where the pressure P0 prior to the preliminary filling is within a range that is equal to or greater than the threshold Ps (S35 in FIG. 2: Yes), the pressure increment ΔP during the preliminary filling has the value that is illustrated by the solid-line graph G32. In this case, the preliminary filling is performed at the flow rate QH (35 g/sec in this embodiment).

In a manner in which the preliminary filling is performed at the flow rate QL regardless of the pressure P0 in the hydrogen gas tank 206 prior to the preliminary filling, the pressure increment ΔP during the preliminary filling has the value that is illustrated by the solid-line graph G31 and the dashed-line graph G33. In other words, the pressure increment ΔP decreases as the pressure P0 in the hydrogen gas tank 206 increases. Accordingly, the pressure increment ΔP cannot take a sufficient value against noise, and the pressure increment ΔP is less likely to be measured with accuracy.

However, in this example, the preliminary filling is performed at the flow rate QH, which exceeds the flow rate QL pertaining to a case where the pressure P0 is within a range less than the threshold Ps, in a case where the pressure P0 prior to the preliminary filling is within a range that is equal to or greater than the threshold Ps (S35 in FIG. 2: No). As a result, the pressure increment ΔP can have a sufficient value against the noise (refer to G32 in FIG. 3). Accordingly, the pressure increment ΔP can be accurately measured (refer to S55 in FIG. 2).

Figure 4:
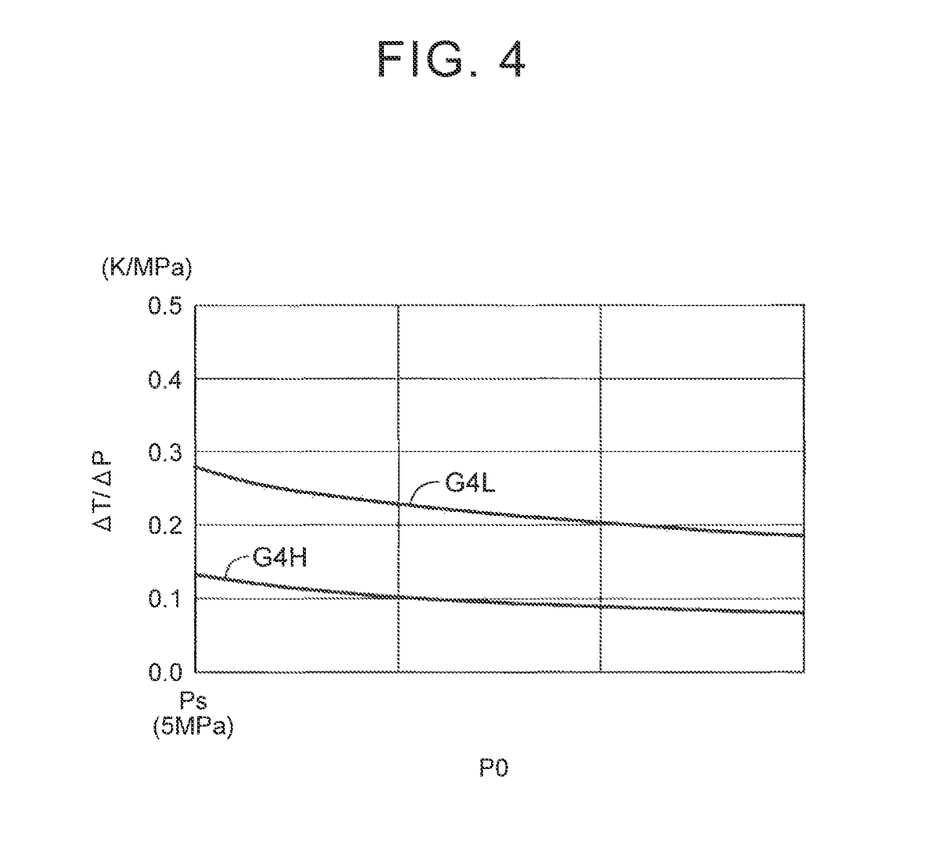
FIG. 4 is a graph illustrating ΔT/ΔP of two hydrogen gas tanks 206H, 206L pertaining to a case where the pressure P0 prior to the preliminary filling has a value that is equal to or greater than a threshold Ps in the embodiment of the invention.

FIG. 4 is a graph illustrating ΔT/ΔP of the two hydrogen gas tanks 206H, 206L pertaining to a case where the pressure P0 prior to the preliminary filling has a value that is equal to or greater than the threshold Ps (5 MPa) in this embodiment. The graph G4H represents ΔT/ΔP of the hydrogen gas tank 206H that releases a large amount of heat to the outside per unit time. The graph G4L, represents ΔT/ΔP of the hydrogen gas tank 206L that release a smaller amount of heat to the outside per unit time than the hydrogen gas tank 206H. It is understood that ΔT/ΔP of the hydrogen gas tank 206H that is superior in heat dissipation has a sufficiently lower value than ΔT/ΔP of the hydrogen gas tank 206L that is inferior in heat dissipation even if the pressure P0 prior to the preliminary filling is in a higher range (P0≤Ps, refer to S35 in FIG. 2). In other words, the range taken by ΔT/ΔP of the hydrogen gas tank 206H that is superior in heat dissipation and the range taken by ΔT/ΔP of the hydrogen gas tank 206L that is inferior in heat dissipation do not overlap with each other. Accordingly, in this embodiment, the determination of Steps S55 and S65 in FIG. 2, that is, the distinction of the cases where the respective maps M1 to M3 should be applied (refer to S60, S70, and S80 in FIG. 2) can be accurately performed.

Figure 5:
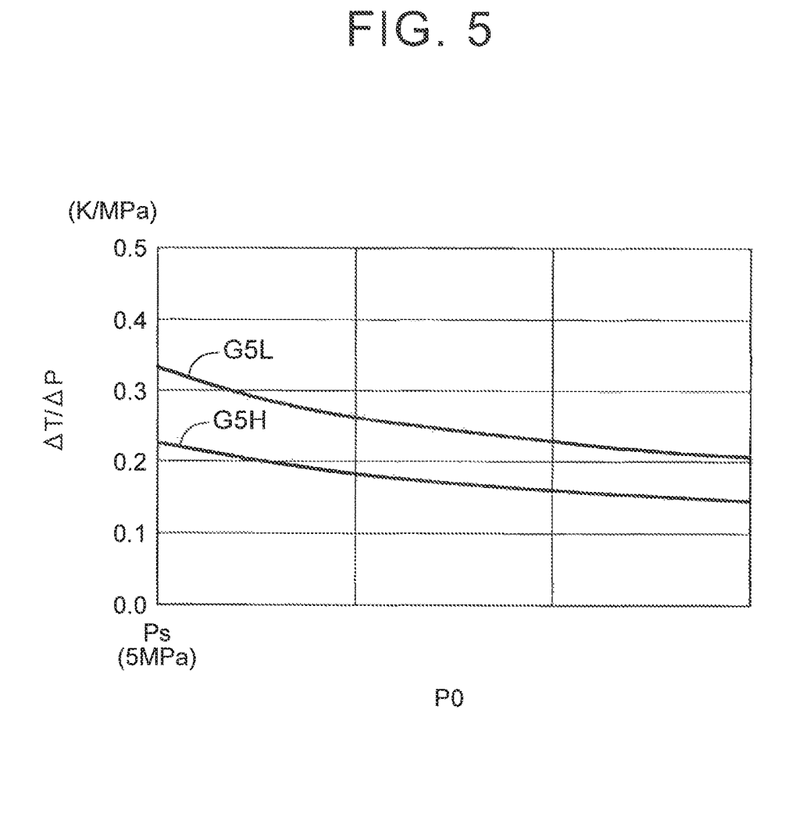
FIG. 5 is a graph illustrating ΔT/ΔP of the hydrogen gas tanks 206H, 206L in an aspect in which the preliminary filling is performed at a flow rate QL regardless of the pressure P0 in the hydrogen tanks.

FIG. 5 is a graph illustrating ΔT/ΔP of the two hydrogen gas tanks 206H, 206L pertaining to a case where the pressure P0 prior to the preliminary filling has a value that is equal to or greater than the threshold Ps (5 MPa) in an aspect in which the preliminary filling is performed at the flow rate QL regardless of the pressure P0 in the hydrogen tanks prior to the preliminary filling. The graph G5H represents ΔT/ΔP of the hydrogen gas tank 206H that releases a large amount of heat to the outside per unit time. The graph G5L represents ΔT/ΔP of the hydrogen gas tank 206L that releases a smaller amount of heat to the outside per unit time than the hydrogen gas tank 206H.

As illustrated in the graph GSH, ΔT/ΔP of the hydrogen gas tank 206H that is superior in heat dissipation has a value of at least 0.2 when the pressure P0 prior to the preliminary filling is close to Ps (5 MPa). As illustrated in the graph G5L, ΔT/ΔP of the hydrogen gas tank 206L that is inferior in heat dissipation has a value close to 0.2 when the pressure P0 prior to the preliminary filling is high. ΔT/ΔP of the hydrogen gas tank 206L that is inferior in heat dissipation takes a value that is lower than ΔT/ΔP of the hydrogen gas tank 206H that is superior in heat dissipation at a time when the pressure P0 prior to the preliminary filling is close to 5 MPa (refer to the right end of the graph G5L and the left end of the graph G5H). Accordingly, in an aspect in which the preliminary filling is performed at the flow rate QL regardless of the pressure P0 in the hydrogen tank prior to the preliminary filling, it is not easy to appropriately perform the selection of the map (refer to Steps S55 and S65 in FIG. 2 according to this embodiment) based on the magnitude of ΔT/ΔP. Also, the measured value includes the noise, and thus it is practically difficult in this aspect to appropriately perform the selection of the map (refer to Steps S60, S70, and S80 in FIG. 2) based on the magnitude of ΔT/ΔR.

In this embodiment, however, the flow rate for the preliminary filling is switched by the pressure of the hydrogen gas tank, and thus the distinction of the cases where the respective maps M1 to M3 should be applied (refer to S60, S70, and S80 in FIG. 2) can be performed with greater accuracy (refer to FIG. 4).

The difference in ΔT/ΔP between the tanks that have the different heat dissipation performances increases as illustrated in FIG. 4 as the flow rate per unit time for the preliminary filling is increased. The reason for this is as follows. When the flow rate per unit time is increased, the pressure increment ΔP pertaining to the preliminary filling increases. An increase in ΔP means an increase in the energy given to the hydrogen gas tank 206 by the preliminary filling, that is, the amount of heat. When the amount of the heat given to the hydrogen gas tank 206 increases, the difference between the amount of the heat released to the outside by the tank superior in heat dissipation and the amount of the heat released to the outside by the tank inferior in heat dissipation increases. As a result, the difference between the superiority and the inferiority of the tanks in heat dissipation appears large in ΔT/ΔP.

Figure 6:
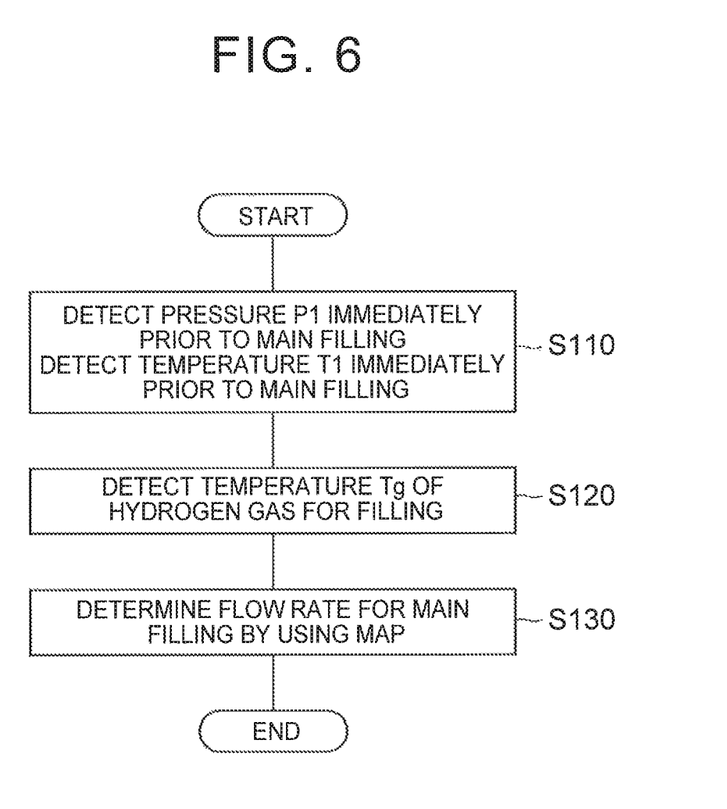
FIG. 6 is a flowchart illustrating processing for setting a hydrogen gas filling flow rate during main filling.

FIG. 6 is a flowchart illustrating processing for setting a hydrogen gas filling flow rate during the main filling. The processing illustrated in FIG. 6 is executed by the control device 130 controlling each section of the hydrogen filling system 100 and, in addition, acquiring necessary information from the vehicle 200. The hydrogen gas filling flow rate for the main filling is set as illustrated in FIG. 6, by using the map that is selected during the processing illustrated in FIG. 2 (refer to S60, S70 and S80 in FIG. 2), after the preliminary filling and immediately prior to the main filling.

In Step S110, the control device 130 acquires a pressure P1 in the hydrogen gas tank 206 immediately prior to the main filling. In addition, the control device 130 acquires a temperature T1 in the hydrogen as tank 206 immediately prior to the main filling. Specifically, the control device 130 acquires the pressure and the temperature in the hydrogen gas tank 206 from the vehicle 200 via the communicator 124 (refer to FIG. 1).

In Step S120, the control device 130 acquires the temperature Tg of the hydrogen gas in the pipe 118. Specifically, the control device 130 acquires the temperature Tg of the hydrogen gas in the pipe 118 from the temperature sensor 121 (refer to FIG. 1). The measurement of the pressure and the temperature in the tank for the determination of the flow rate for the main filling and the temperature of the gas to be supplied to the tank can also be performed at an earlier moment. It is preferable that the length of time from the measurement of the parameters to the initiation of the main filling is short.

In Step S130, the control device 130 determines the flow rate of the hydrogen gas for the main filling by using one of the maps M1 to M3 selected in the processing illustrated in FIG. 2 and based on the pressure P1 and the temperature T1 in the hydrogen gas tank 206 and the temperature Tg of the hydrogen gas that is used in the filling.

During the main filling, the hydrogen gas filling is performed at the flow rate that is determined in the processing illustrated in FIG. 6. In this embodiment, the hydrogen gas tank 206 is filled with the hydrogen gas until the pressure of the hydrogen gas in the hydrogen gas tank 206 reaches 70 MPa.

In this manner, the hydrogen gas tank 206 can be filled with the hydrogen gas within a short period of time while a situation is avoided in which the temperature of the hydrogen gas tank 206 increases to exceed a temperature that is set in advance.

B. Second Embodiment

B1. Preliminary Filling and Flow Rate Determination

In a second embodiment, the method for determining the flow rate for the main filling based on the result of the preliminary filling (refer to Steps S55 to S80 in FIG. 2 and FIG. 6) and the filling control method for the main filling are different from those of the first embodiment. In addition, the hydrogen filling system 100 according to the second embodiment is not provided with the maps M1 to M3 (refer to FIG. 1). The second embodiment is identical to the first embodiment regarding the rest.

Figure 7:
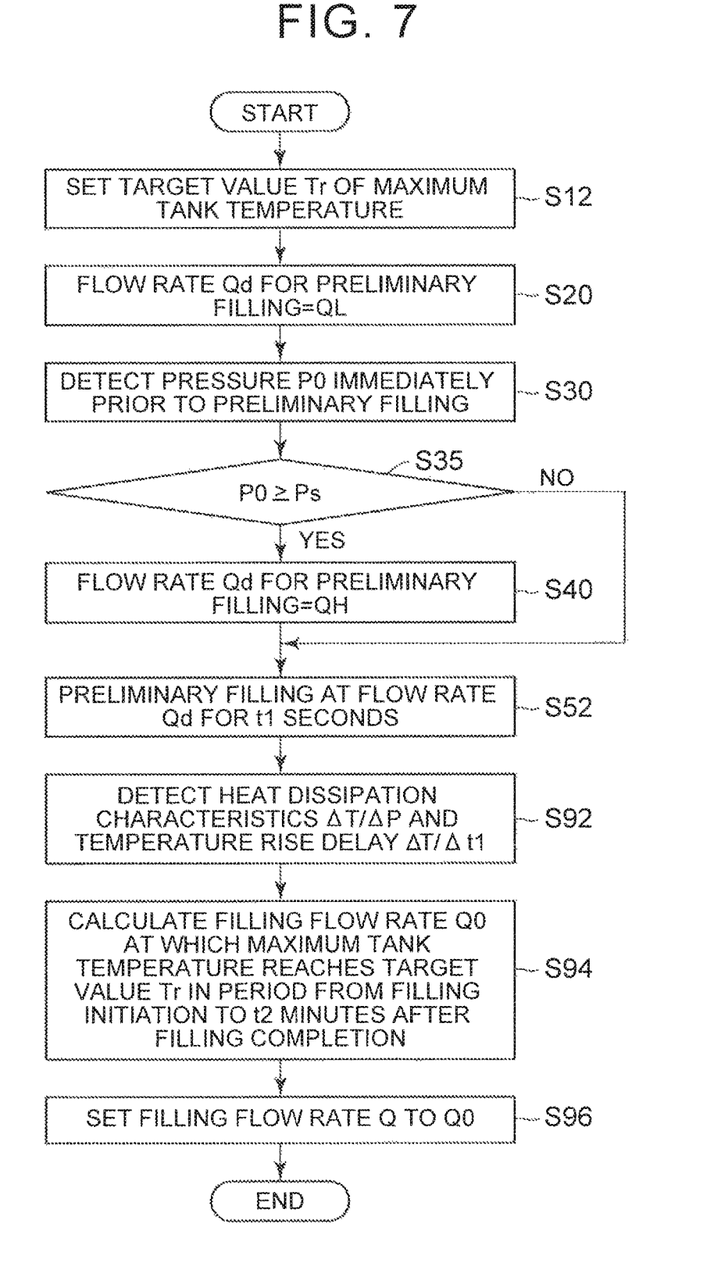
FIG. 7 is a flowchart illustrating the processing of the preliminary filling and processing for determining a main filling flow rate that are carried out when the hydrogen gas tank 206 of the vehicle 200 is filled with the hydrogen gas by the hydrogen filling system 100.

FIG. 7 is a flowchart illustrating the processing of the preliminary filling and processing for determining a main filling flow rate that are carried out when the hydrogen gas tank 206 of the vehicle 200 is filled with the hydrogen gas by the hydrogen filling system 100. The processing illustrated in FIG. 7 is executed by the control device 130 controlling each section of the hydrogen filling system 100 and, in addition, acquiring necessary information from the vehicle 200. The processing illustrated in FIG. 7 corresponds to the processing in FIG. 2 and the processing in FIG. 6 according to the first embodiment.

In Step S12, the control device 130 sets an upper limit temperature Tr for the hydrogen gas tank 206. The upper limit temperature Tr can be, for example, a temperature that is a predetermined amount below the 85° C. temperature defined in the SAEJ2601 Standard.

The processing of Steps S20 to S40 in FIG. 7 is identical to the processing of Steps S20 to S40 in FIG. 2 according to the first embodiment.

In Step S52, the control device 130 performs the preliminary filling for a predetermined period of time t1 at the flow rate Qd that is set. The period of time t1 during which the preliminary filling is performed may be identical to or different from the period of time t1 during which the preliminary filling is performed in the first embodiment.

The pressure of the hydrogen gas in the hydrogen gas tank 206 is measured by the pressure sensor 207 while the preliminary filling is being performed (refer to FIG. 1). In addition, the temperature of the hydrogen gas in the hydrogen gas tank 206 is measured by the temperature sensor 208 while the preliminary filling is being performed.

In Step S92, the control device 130 calculates a temperature increment ΔT in the period of time t1 during which the preliminary filling is performed with respect to a pressure increment ΔP in the period of time t1 during which the preliminary filling is performed, that is, ΔT/ΔP. In addition, the control device 130 calculates a temperature increment ΔT/t1 per unit time pertaining to the preliminary filling.

As described in the description of the first embodiment, ΔT/ΔP represents the ease of heat dissipation by the hydrogen gas tank 206. In other words, the hydrogen tank releases more heat to the outside per unit time as ΔT/ΔP becomes smaller. In addition, the temperature increment ΔT/t1 per unit time represents the ease of temperature change in the hydrogen gas tank 206.

As the hydrogen gas tank 206 is filled with the hydrogen gas, the hydrogen gas is blown into the hydrogen gas tank 206 from a filling port of the hydrogen gas tank 206. Then, the hydrogen gas is adiabatically compressed from the filling port toward the corner of the hydrogen gas tank 206, and the temperature of the hydrogen gas increases. This results in the hydrogen gas that is present in the vicinity of the end portion on the side facing the filling port having the highest temperature by hydrogen gas filling. Then, after the hydrogen gas filling is terminated, a certain length of time is required until the irregularity in the temperature distribution in the hydrogen gas tank 206 is eliminated and the temperature in the hydrogen gas tank 206 becomes substantially uniform.

In an aspect in which the temperature sensor 208 is disposed at a place other than the vicinity of the end portion on the side facing the filling port, for example, in the vicinity of the filling port, the temperature of the hydrogen gas in the vicinity of the temperature sensor 208 is lower than the temperature of the hydrogen gas in the end portion on the side facing the filling port when the filling is terminated. The temperature of the hydrogen gas in the vicinity of the temperature sensor 208 further rises to exceed the temperature at the termination of the filling, as the temperature in the hydrogen gas tank 206 becomes uniform, after the termination of the gas filling. The length of time that is taken for the temperature of the hydrogen gas in the vicinity of the temperature sensor 208 to reach the maximum value after the termination of the gas filling depends on the ease of temperature change (thermal conductivity) in the hydrogen gas tank 206. $\Delta T/t1$ that is calculated in Step S92 in FIG. 7 represents the ease of temperature change in the hydrogen gas tank 206, and thus is a measure of the time delay pertaining to a rise in the temperature of the hydrogen gas tank 206.

In Step S94 in FIG. 7, the control device 130 creates a model relating to the temperature change in the hydrogen gas tank 206 based on the parameters $\Delta T/\Delta P$ and $\Delta T/t1$ obtained in Step S92. Then, the control device 130 calculates the temperature change in the hydrogen gas tank 206 pertaining to the period from the initiation of the hydrogen gas filling for the main filling to the moment equivalent to the sum of a period of time t2 and the moment of the termination of the hydrogen gas filling. In other words, in this embodiment, the control device 130 performs model reference-type control. The period of time t2 is 60 minutes in this embodiment.

In Step S94, the control device 130 calculates, by using the above-described model, a flow rate Q0 that is the maximum flow rate possible at which the temperature of the hydrogen gas tank 206 does not exceed the upper limit temperature Tr that is determined in Step S12 between the initiation of the hydrogen gas filling and the moment equivalent to the sum of the period of time t2 and the moment of the termination of the hydrogen gas filling.

In Step S96, the control device 130 sets the flow rate Q0 that is obtained in Step S94 as a flow rate for the main filling.

In the second embodiment, the flow rate determination for the preliminary filling and the main filling is performed in the processing described above. In this manner, the flow rate Q0, which allows the filling to be completed within a short period of time, can be set as a flow rate Q for the main filling in view of the temperature distribution (irregularity) of the hydrogen gas in the hydrogen gas tank 206 and the temperature change covering even the period that follows the completion of the filling.

According to the second embodiment, the pressure increment during the preliminary filling can be accurately measured (refer to FIG. 3) for a reason similar to that of the first embodiment (refer to Steps S20 to S40 in FIG. 7). Accordingly, accurate modeling can be performed based on accurate $\Delta T/\Delta P$ (refer to FIG. 4 and Steps S92 and S94 in FIG. 7). As a result, an appropriate flow rate Q0, which is the maximum flow rate possible at which the temperature of the tank does not exceed the upper limit temperature Tr, can be calculated.

B2. Main Filling

In the first embodiment, the main filling is performed at the constant flow rate that is determined in the processing illustrated in FIG. 6. In the main filling according to the second embodiment, however, the flow rate of the hydrogen gas is changed (that is, controlled) based on a predicted temperature value Tm obtained from the model and a measured temperature T2 although the main filling is performed based on the flow rate that is determined in the processing illustrated in FIG. 7.

Figure 8:
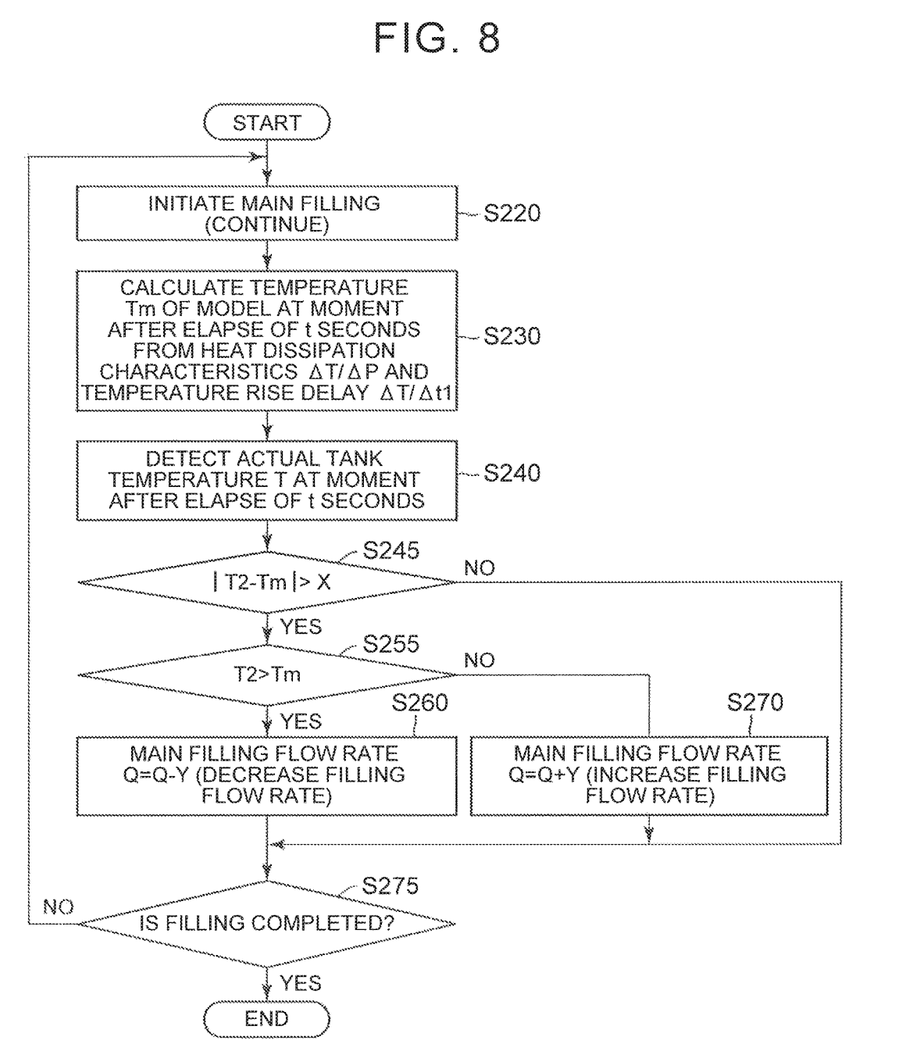
FIG. 8 is a flowchart illustrating the processing of the main filling that is carried out when the hydrogen gas tank 206 of the vehicle 200 is filled with the hydrogen gas by the hydrogen filling system 100.

FIG. 8 is a flowchart illustrating the processing of the main filling that is carried out when the hydrogen gas tank 206 of the vehicle 200 is filled with the hydrogen gas by the hydrogen filling system 100. The processing in FIG. 8 is executed by the control device 130 controlling each section of the hydrogen filling system 100 and, in addition, acquiring necessary information from the vehicle 200.

In Step S220, the control device 130 initiates the main filling. In this case, the control device 130 controls the flow rate adjusting valve 115 based on the flow rate Q that is determined in the processing illustrated in FIG. 7.

In Step S230, the control device 130 calculates the predicted temperature Tm pertaining to a moment the period of time t after the initiation of the main filling based on the model relating to the temperature change in the hydrogen gas tank 206 (refer to 894 in FIG. 7) and based on the parameters $\Delta T/\Delta P$ and $\Delta T/t1$ obtained in Step S92 illustrated in FIG. 7. The processing of Step S230 is model reference-type control as is the case with the processing of S94 in FIG. 7.

In Step S240, the control device 130 acquires the pressure P1 in the hydrogen gas tank 206 the period of time t after the main filling initiation. Specifically, the control device 130 acquires the temperature T2 in the hydrogen gas tank 206 that is acquired by the temperature sensor 208 from the vehicle 200 via the communicator 124 the period of time t after the main filling initiation (refer to FIG. 1).

In Step S245, the control device 130 determines whether or not the deviation (absolute value of the difference) between the measured value T2 of the temperature in the hydrogen gas tank 206 and the predicted temperature Tm exceeds a threshold X. In a case where the deviation between the measured value T2 and the predicted temperature Tm does not exceed the threshold X (S245: No), the processing proceeds to Step S275. In a case where the deviation between the measured value T2 and the predicted temperature Tm exceeds the threshold X (S245: Yes), the processing proceeds to Step S255.

In Step S255, the control device 130 determines whether or not the measured value T2 of the temperature in the hydrogen gas tank 206 exceeds the predicted temperature Tm. In a case where the measured value T2 exceeds the predicted temperature Tm (S255: Yes), the processing proceeds to Step S260. In Step S260, the control device 130 decreases the flow rate Q of the hydrogen gas by Y (Y<Q).

In a case where the measured value T2 does not exceed the predicted temperature Tm in Step S255 (S255: No), the processing proceeds to Step S270, in Step S270, the control device 130 increases the flow rate Q of the hydrogen gas by Y.

In Step S275, the control device 130 determines whether or not the main filling should be completed. More specifically, the control device 130 determines whether or not the pressure in the hydrogen gas tank 206 has reached a predetermined value (70 MPa in this embodiment). In a case where the pressure in the hydrogen gas tank 206 is less than the predetermined value (S275: No), the processing returns to Step S220. The main filling continues in Step S220. In a case where the pressure in the hydrogen gas tank 206 has reached the predetermined value (S275: Yes), the processing is terminated.

In this embodiment, the following effects can be achieved by performing the processing of Steps S245 to S270. During the main filling, the maximum temperature is not allowed to exceed Tr (refer to S12 in FIG. 7) based on the model, and thus the flow rate can be controlled to be increased to the maximum extent possible (S270 in FIG. 8) while the measured value T2 of the temperature in the hydrogen gas tank 206 at each moment is allowed to be close to the predicted value Tm (S245 and S260 in FIG. 8). Accordingly, the hydrogen gas filling can be performed within a short period of time while the hydrogen gas tank 206 is protected.

C. Third Embodiment

In a third embodiment, the method for setting the flow rate for the preliminary filling (refer to Steps S20 and S35 in FIG. 2) is different from that in the first embodiment. The third embodiment is identical to the first embodiment regarding the rest.

Figure 9:
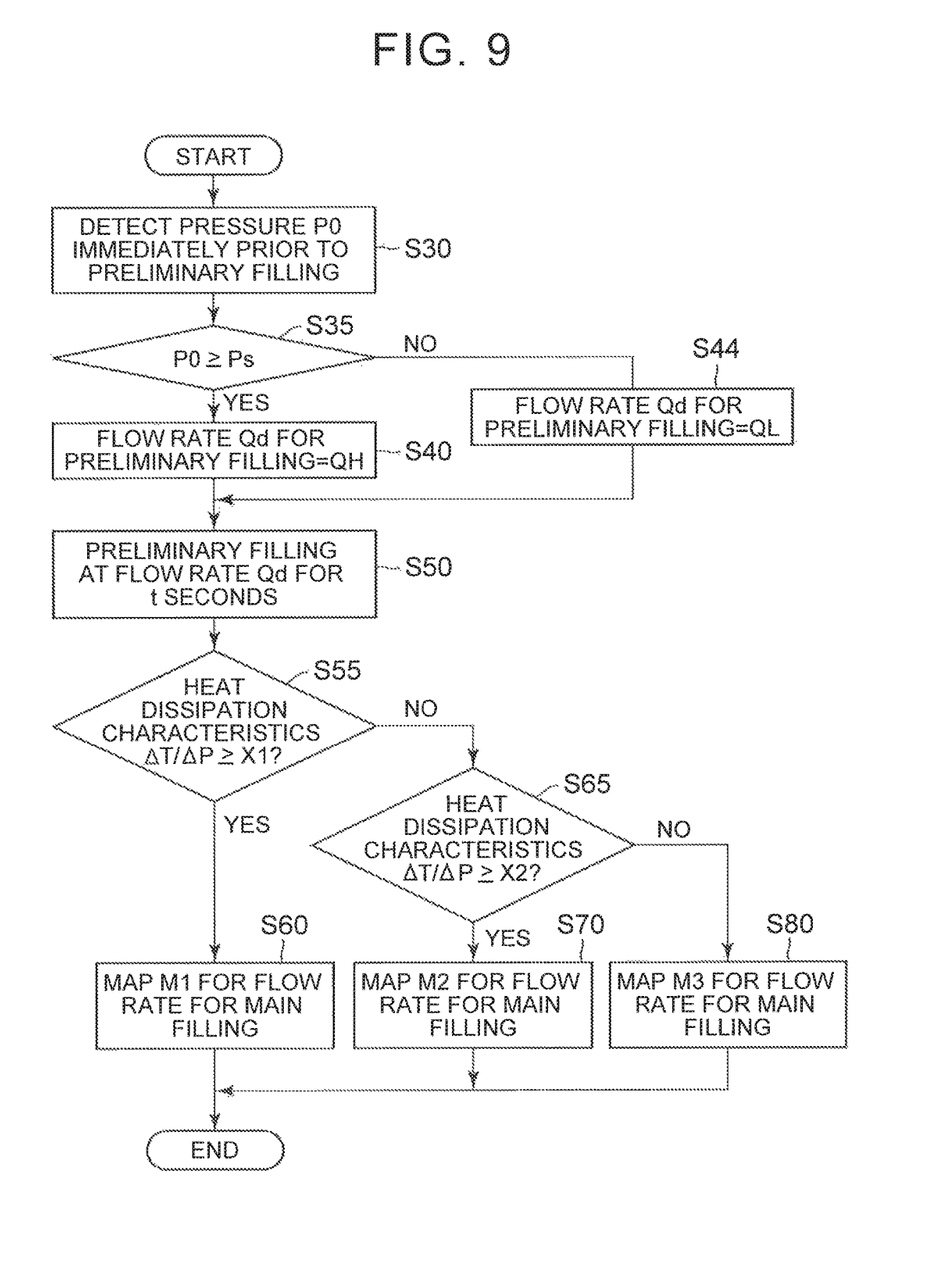
FIG. 9 is a flowchart illustrating the processing of the preliminary filling that is carried out when the hydrogen gas tank 206 is filled with the hydrogen gas.

FIG. 9 is a flowchart illustrating the processing of the preliminary filling that is carried out when the hydrogen gas tank 206 of the vehicle 200 is filled with the hydrogen gas by the hydrogen filling system 100. The processing in FIG. 9 is executed by the control device 130 controlling each section of the hydrogen filling system 100 and, in addition, acquiring necessary information from the vehicle 200. The processing in FIG. 9 corresponds to the processing in FIG. 2 according to the first embodiment. In FIG. 9, the same Step number as in FIG. 2 is used to refer to the processing identical to that in FIG. 2.

In the third embodiment, the first processing for setting the flow rate Qd of the hydrogen gas to QL for the preliminary filling is not performed (refer to S20 in FIG. 2). In a case where the pressure P0 of the hydrogen gas tank 206 is less than the threshold Ps in Step S35 (S35: No), the processing proceeds to Step S44.

In Step S44, the control device 130 sets the flow rate Qd of the hydrogen gas for the preliminary filling to QL. QL is 12 g/sec in this embodiment. The processing of Step S44 is identical to the processing in FIG. 2 according to the first embodiment. Then, the processing proceeds to Step S50.

The processing starting from Step S50 in FIG. 9 is identical to the processing starting from Step S50 in FIG. 2.

In this manner, the pressure change during the preliminary filling can be accurately measured by using the simple processing (refer to Steps S35, S40, and S44). As a result, the selection of the map (refer to Steps S55 and S65) that is used during the flow rate determination for the main filling can be appropriately performed as in the first embodiment.

D. Modification Example

D1. First Modification Example

The flow rate for the gas filling for the preliminary filling may be changed during the preliminary filling. However, it is preferable that the average value of the flow rate for the preliminary filling at a time when the pressure in the tank prior to the initiation of the preliminary filling is within a first range is lower than the average value of the flow rate for the preliminary filling at a time when the pressure in the tank prior to the initiation of the preliminary filling is within a second range which does not overlap with the first range and is higher than the first range.

D2. Second Modification Example

The threshold Ps of the pressure for switching the flow rate for the preliminary filling can also have another value such as 2 MPa and 8 MPa. However, the threshold Ps of the pressure for switching the flow rate for the preliminary filling is preferably 1 to 10 MPa and more preferably 3 to 7 MPa. When the threshold of the pressure for switching the flow rate for the preliminary filling has the values described above, the pressure increment can be accurately measured during the preliminary filling of the tank for filling the tank with the gas to reach a maximum pressure of 70 MPa, D3. Third Modification Example The measurement of the temperature and the pressure of the gas in the hydrogen gas tank 206 may be performed at two different moments in the preliminary filling period. However, the times at which ΔT and ΔP are measured during the determination of the flow rate amount for the main filling using the temperature increment ΔT and the pressure increment ΔP pertaining to the preliminary filling share the same time interval.

D4. Fourth Modification Example

The pressure increment ΔP and the temperature increment ΔT that are acquired during the preliminary filling can also be a pressure increment and a temperature increment pertaining to a time interval that is part of the period of time t1 during which the preliminary filling is performed. The measurement of the pressure increment and the temperature increment excluding a predetermined time interval immediately after the preliminary filling initiation and a predetermined time interval immediately prior to the preliminary filling termination allows the measurement to be performed with little noise.

D5. Fifth Modification Example

The temperature increment per unit time during the preliminary filling may be calculated with regard to another time interval (partial time interval) in the preliminary filling. However, it is preferable that the temperature increment per unit time is calculated by using a temperature change pertaining to a longer time interval. This is because the temperature increment per unit time that is obtained in this manner is less likely to be affected by a local temperature change over a shorter time interval.

D6. Sixth Modification Example

The flow rate for the main filling can also be determined by another method in which the pressure increment and the temperature increment pertaining to the preliminary filling are used instead of the method in which ΔT/ΔP is used.

D7. Seventh Modification Example

The flow rate determination for the main filling may be performed by another configuration such as the control device for the vehicle and an external configuration that provides data for the control unit for the gas filling system.

D8. Eighth Modification Example

The main filling is performed at a constant flow rate in the first embodiment described above and the flow rate for the hydrogen gas filling for the main filling is constant in the first embodiment described above. However, the flow rate for the gas filling for the main filling may be changed during the preliminary filling. For example, the main filling may be initiated based on the flow rate that is determined based on the preliminary filling and then the flow rate may be changed in accordance with a measured parameter (refer to FIG. 8 pertaining to the second embodiment).

The invention is not limited to the embodiments, the examples, and the modification examples described above, and can be realized in various configurations without departing from the scope and spirit of the invention. For example, the technical characteristics of the embodiments, the examples, and the modification examples corresponding to the technical characteristics in the respective aspects described in the SUMMARY OF THE INVENTION can be appropriately switched or combined so as to address some or all of the above-described objects or to achieve some or all of the above-described effects. In addition, the technical characteristics can be appropriately deleted unless the technical characteristics are described as essential in the present specification.

What is claimed is:

1. A system for controlling a gas supply unit supplying gas to a tank, the system comprising:
   a communicator that receives an information of the pressure in the tank; and
   an electronic control unit programmed to:
      perform first filling for supplying the gas to the tank for a predetermined period of time by controlling the gas supply unit,
      perform second filling for supplying the gas to the tank after performing the first filling, based on a flow rate determined based on a change in the pressure in the tank for the predetermined period of time during the first filling, by controlling the gas supply unit,
      cause the gas supply unit to perform the first filling at a first flow rate in a case where the pressure in the tank prior to the first filling is a first pressure,
      cause the gas supply unit to perform the first filling at a second flow rate exceeding the first flow rate in a case where the pressure in the tank prior to the first filling is a second pressure exceeding the first pressure, and
      select between the first and second flow rates based on the pressure in the tank prior to the first filling,
   wherein the electronic control unit is programmed to perform the second filling after the first filling if the first filling is at the first flow rate, and programmed to perform the second filling after the first filling if the first filling is at the second flow rate.

2. The system according to claim 1,
   wherein the electronic control unit is programmed to set the flow rate for the first filling to the first flow rate in a case where the pressure in the tank prior to the first filling is less than a threshold that is greater than the first pressure and that is equal to or less than the second pressure, and the electronic control unit is programmed to set the flow rate for the first filling to the second flow rate in a case where the pressure in the tank prior to the first filling exceeds the threshold.

3. The system according to claim 1,
   wherein the electronic control unit is programmed to set a flow rate for the first filling to the first flow rate prior to the setting of a flow rate for the first filling in accordance with the pressure in the tank.

4. The system according to claim 2,
   wherein the threshold is within a range of 1 to 10 MPa.

5. The system according to claim 1, the system further comprising:
   a temperature acquisition unit configured to acquire the temperature in the tank,
   wherein the electronic control unit is programmed to set the flow rate of the gas for the second filling in accordance with a first map for determining the flow rate of the gas based on the temperature and the pressure in the tank prior to the second filling when a change in the temperature in the tank for the predetermined period of time with respect to a change in the pressure in the tank for the predetermined period of time during the first filling is within a first range, and the electronic control unit is programmed to set the flow rate of the gas for the second filling in accordance with a second map for determining the flow rate of the gas based on the temperature and the pressure in the tank prior to the second filling, the second map determining a flow rate greater than in the first map with respect to the same input parameter, when the temperature change with respect to the pressure change is within a second range that is less than the first range.

6. The system according to claim 1, the system further comprising:
   a temperature acquisition unit configured to acquire the temperature in the tank,
   wherein the electronic control unit is programmed to calculate a change in the temperature in the tank per unit time, and set the flow rate of the gas for the second filling based on a change in the temperature in the tank for the predetermined period of time with respect to a change in the pressure in the tank for the predetermined period of time during the first filling and the change in the temperature in the tank per unit time during the first filling, and the electronic control unit is programmed to calculate a predicted value of the temperature in the tank, and control the flow rate of the gas for the second filling based on the temperature in the tank during the second filling and the predicted value of the temperature in the tank during the second filling determined based on the temperature change with respect to the pressure change and the temperature change per unit time.

* * * * *